Feb. 9, 1971  P. M. JASBERG  3,562,131
CATHODE HANDLING EQUIPMENT
Filed March 21, 1968  15 Sheets-Sheet 1
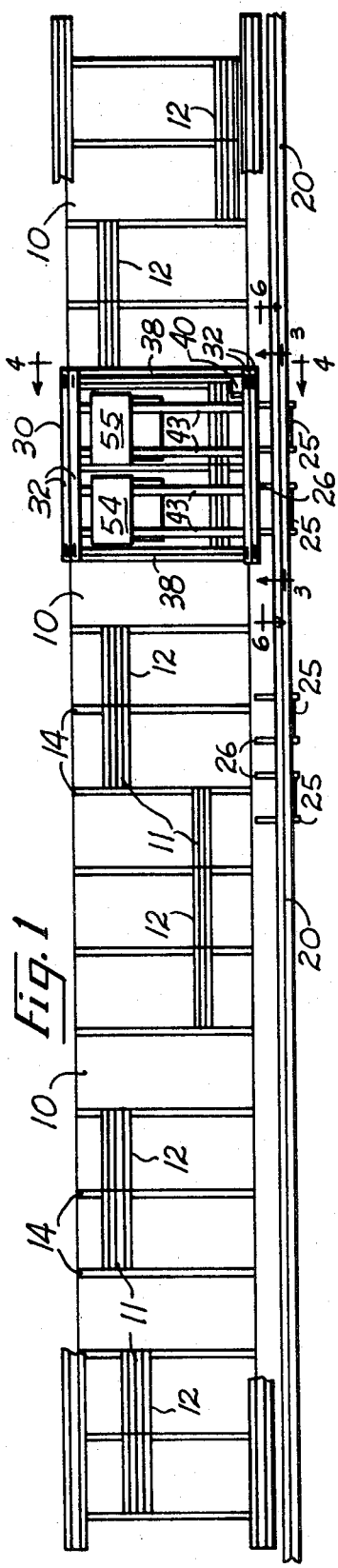
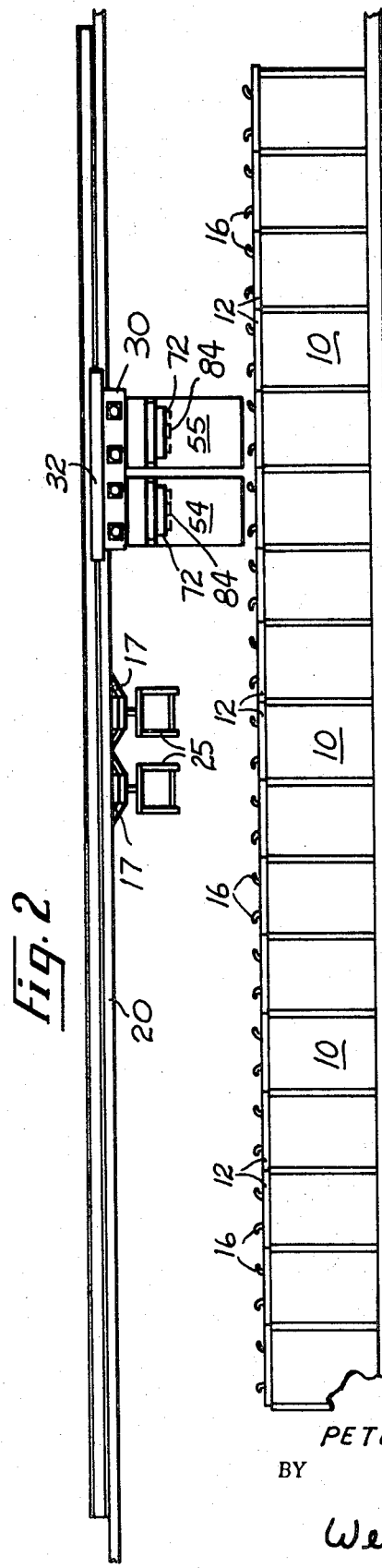
INVENTOR.
PETER M. JASBERG
BY
Wells & St. John

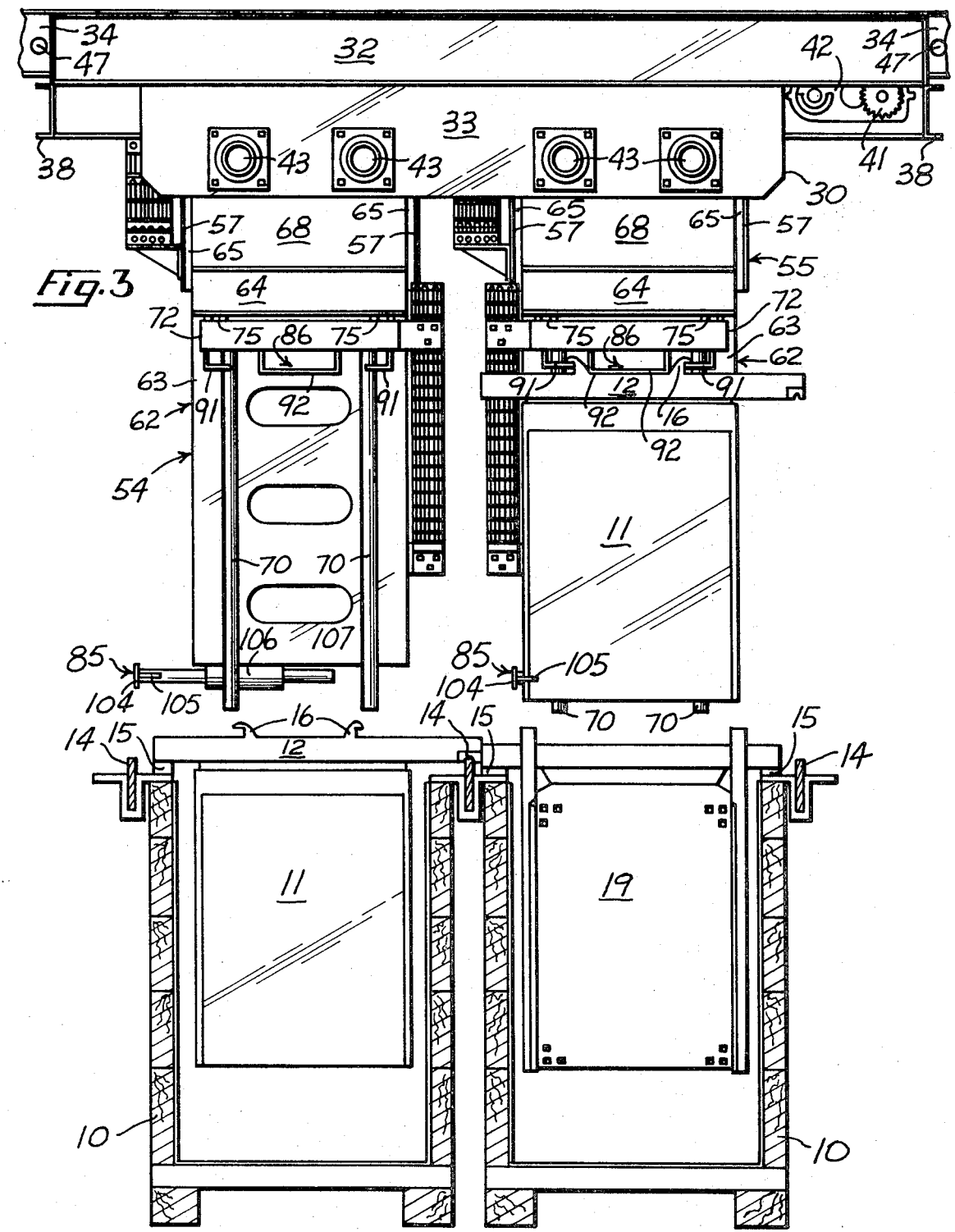

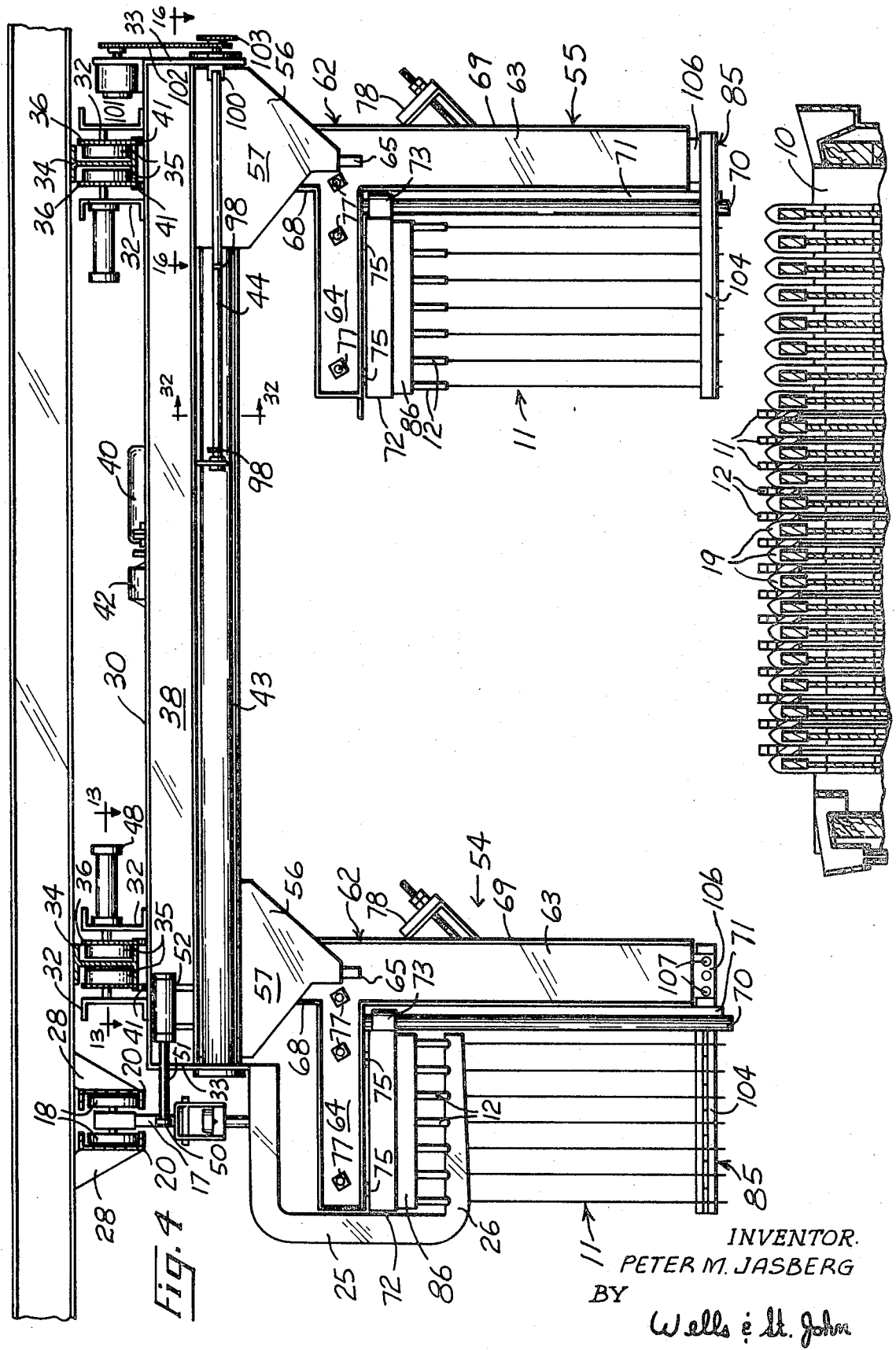

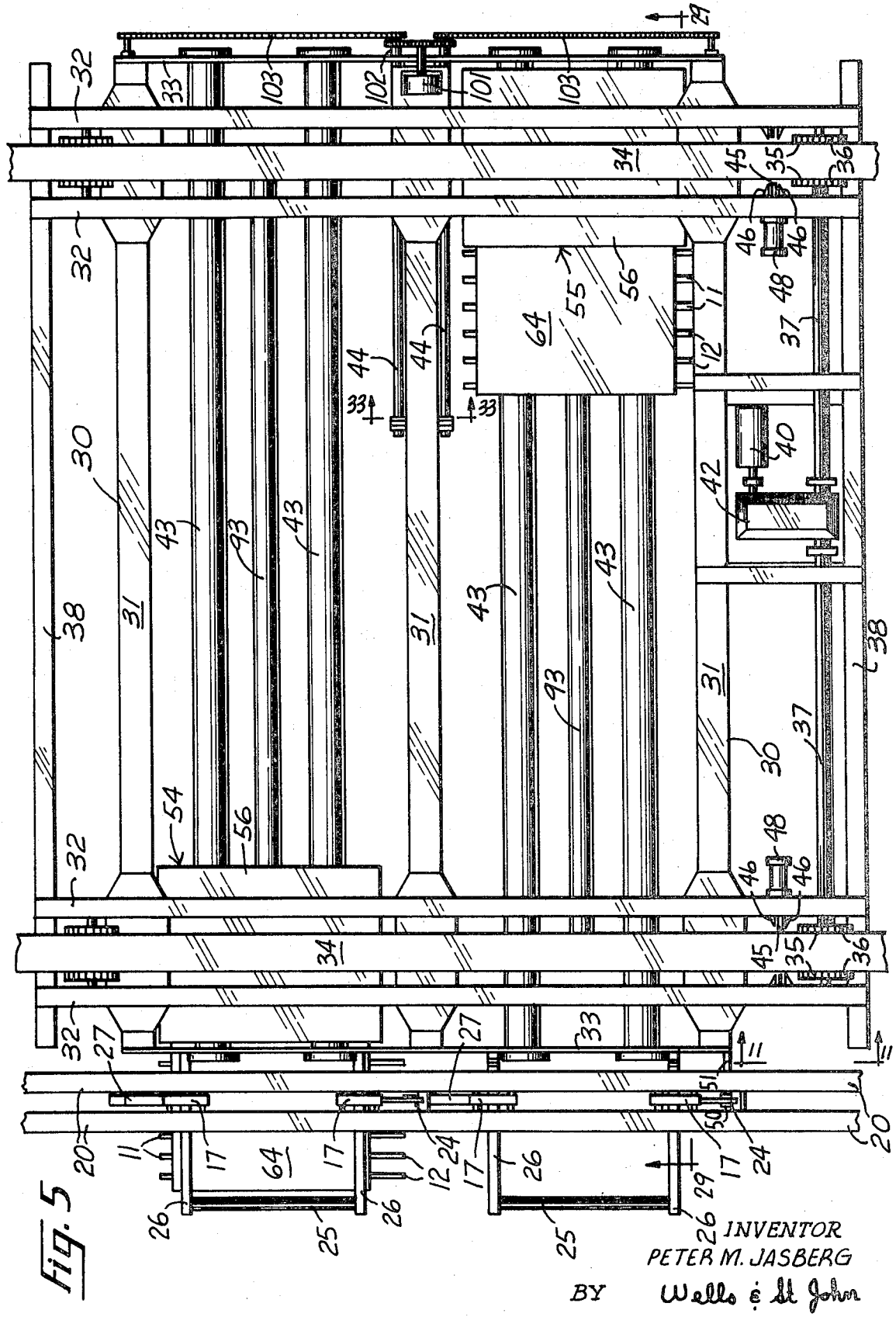

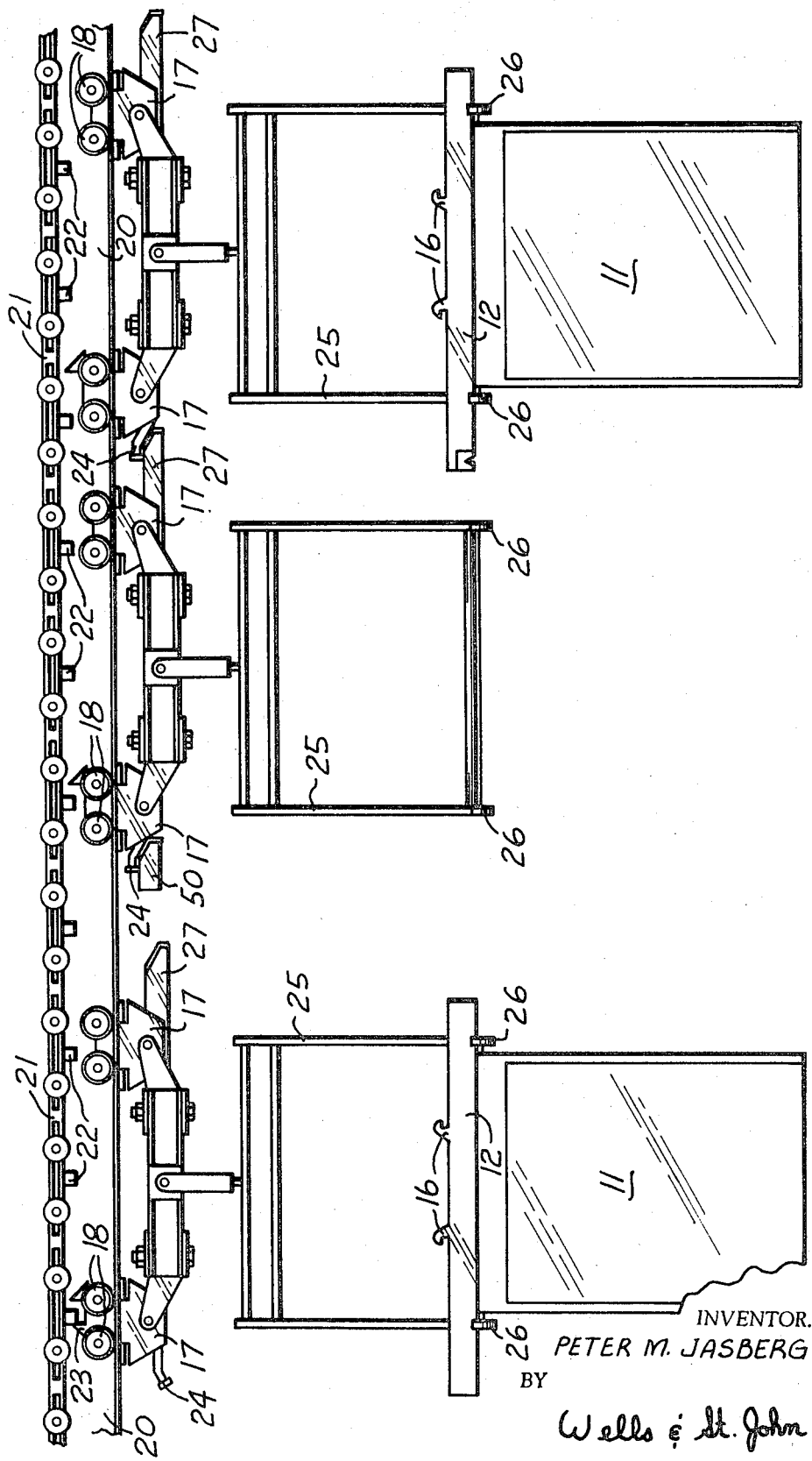

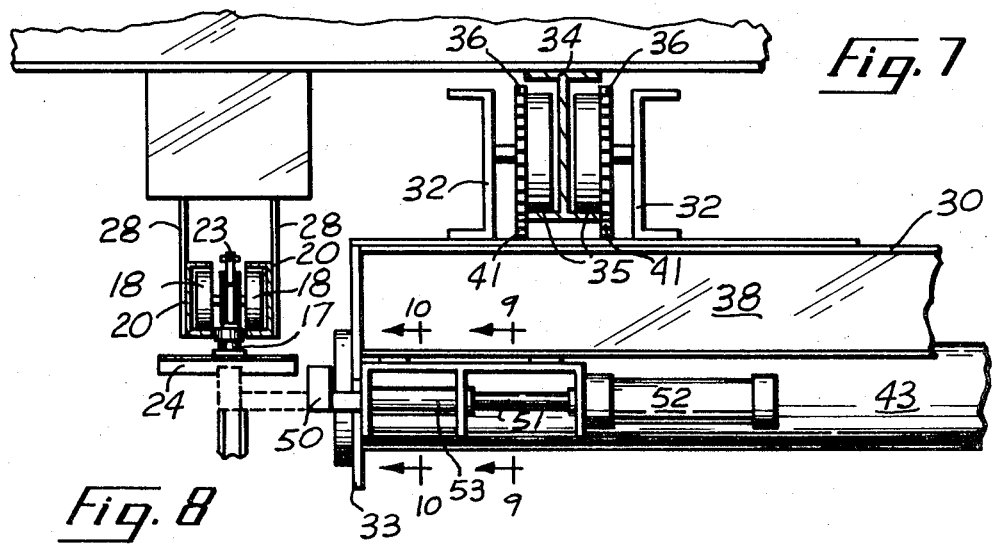
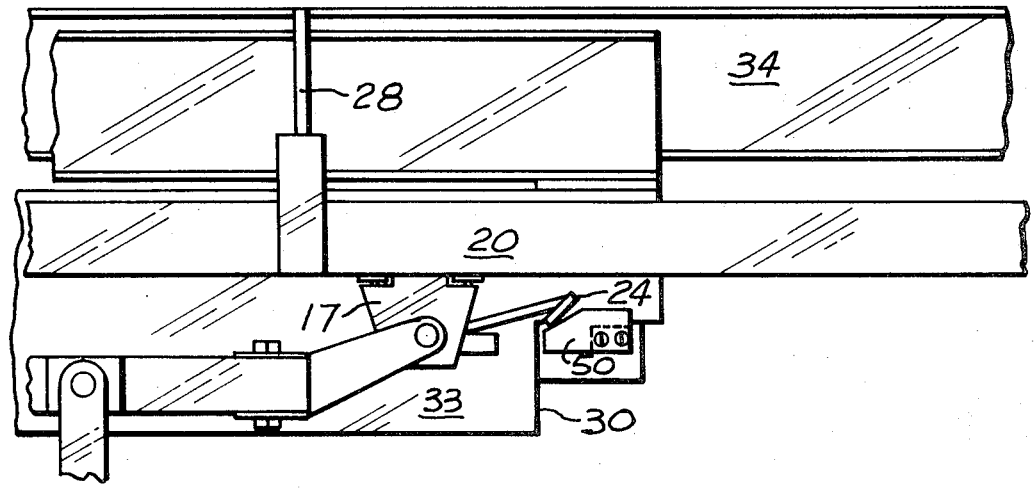

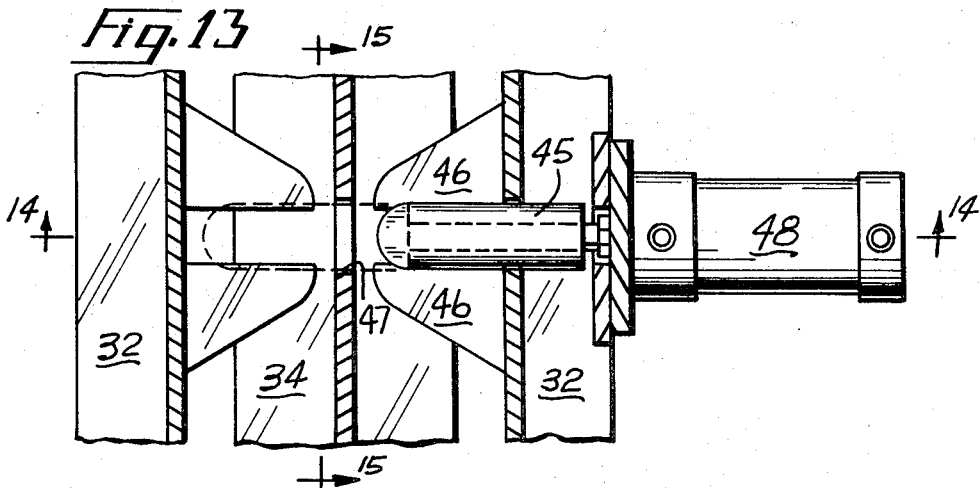
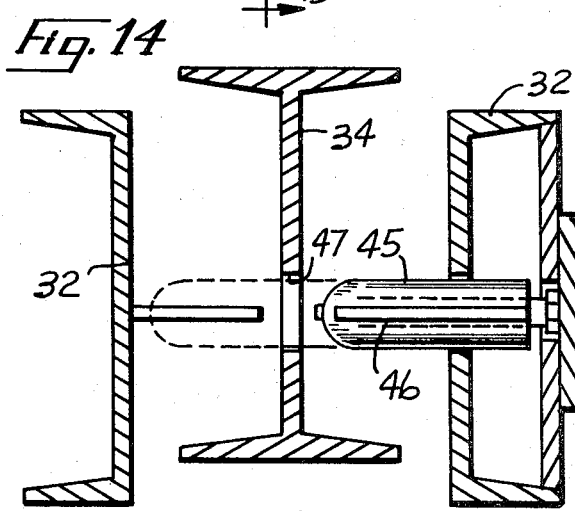
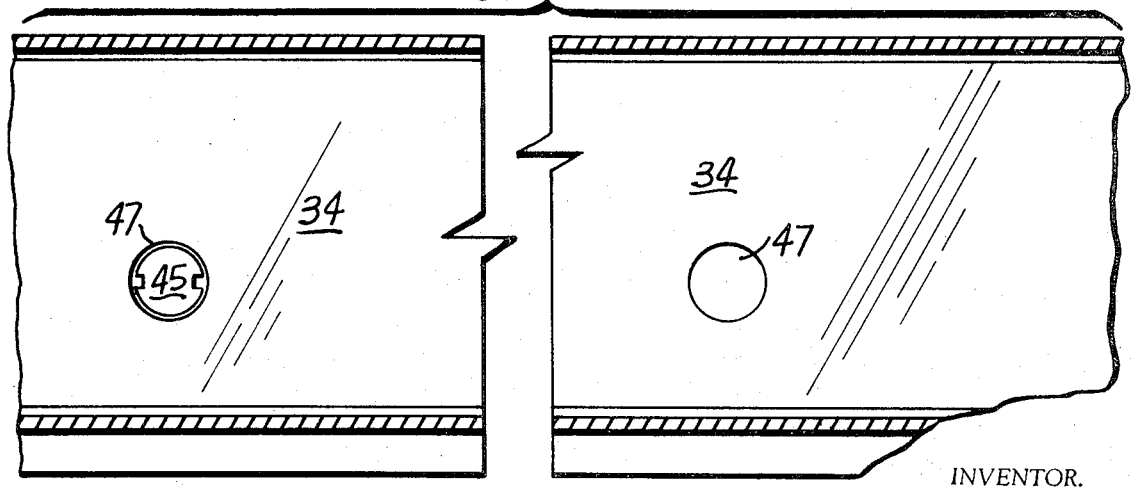

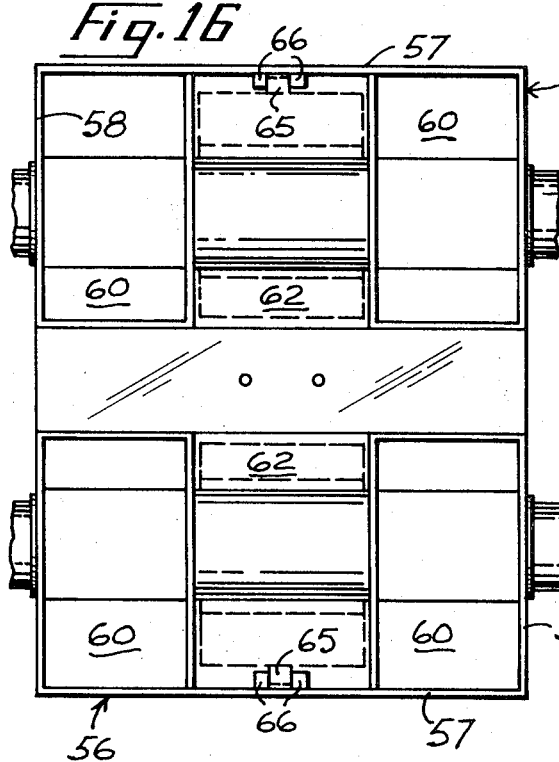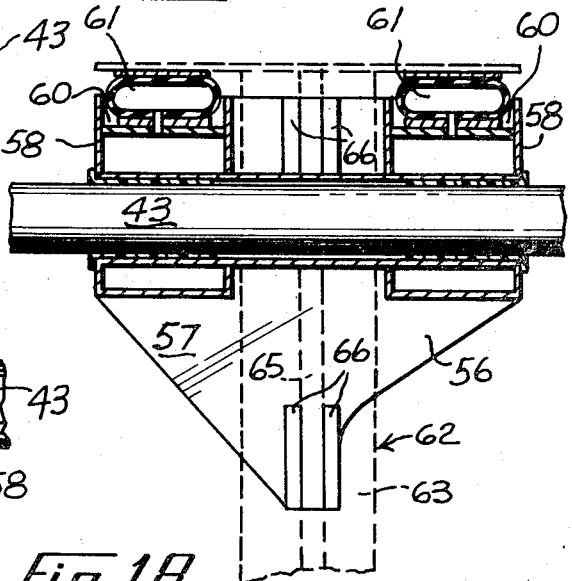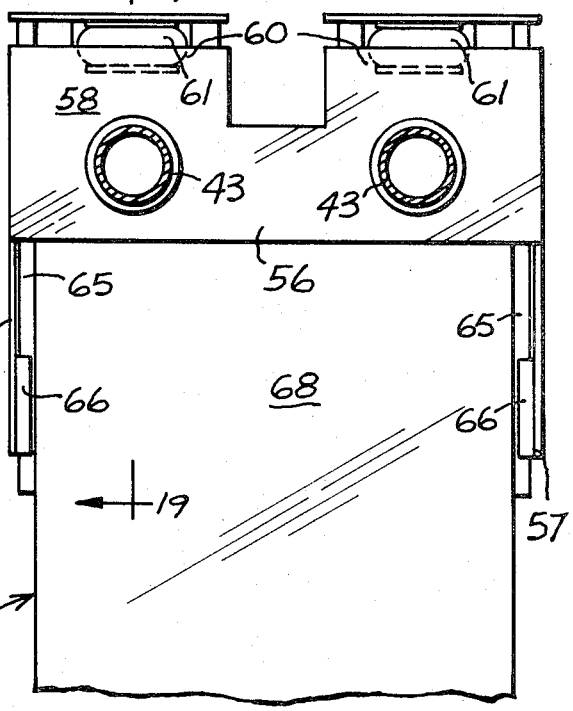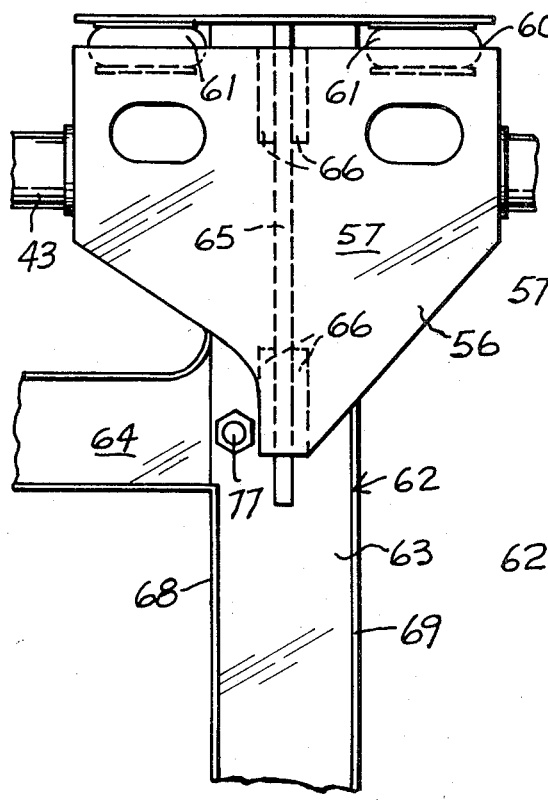

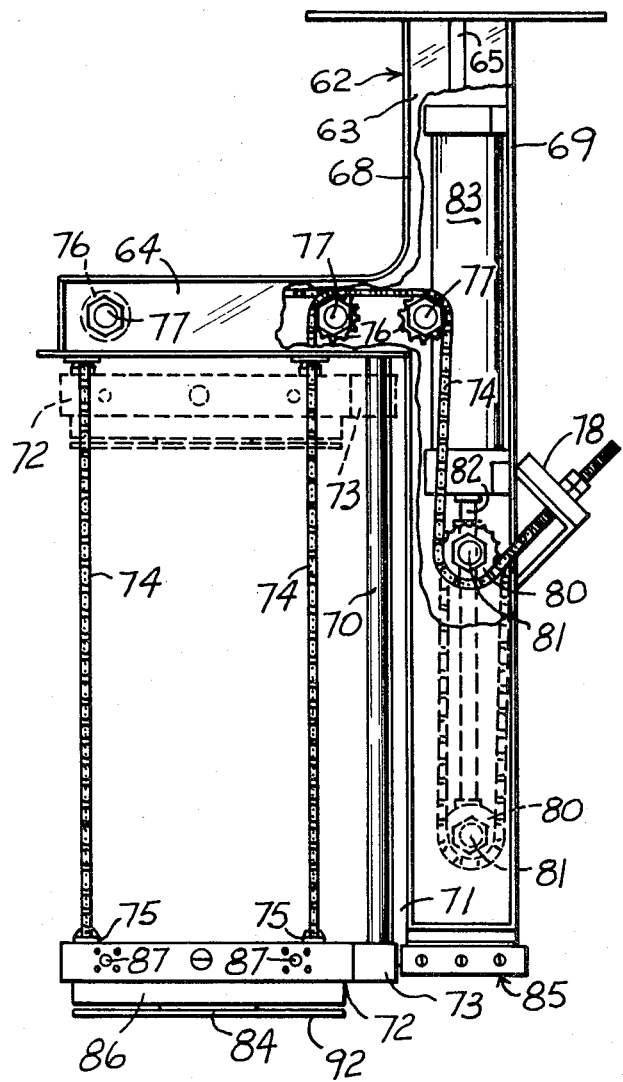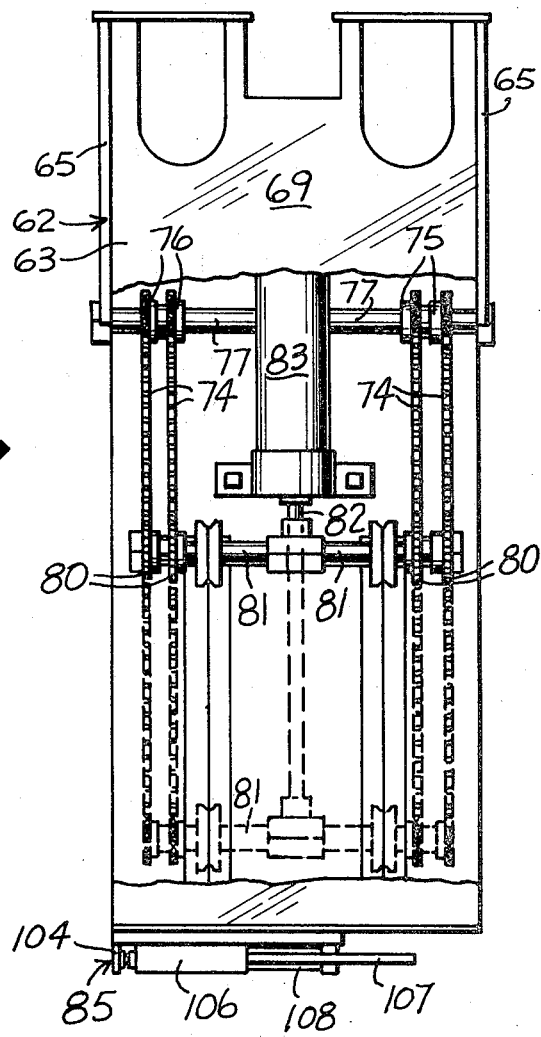

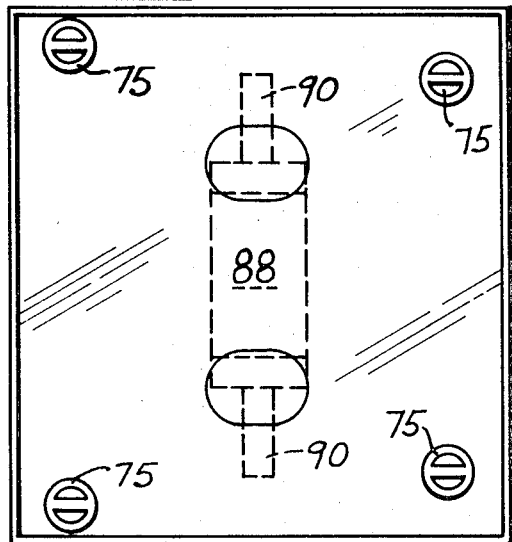
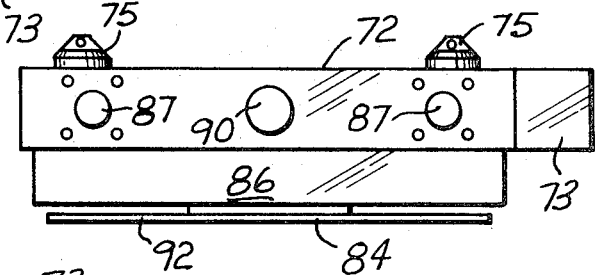
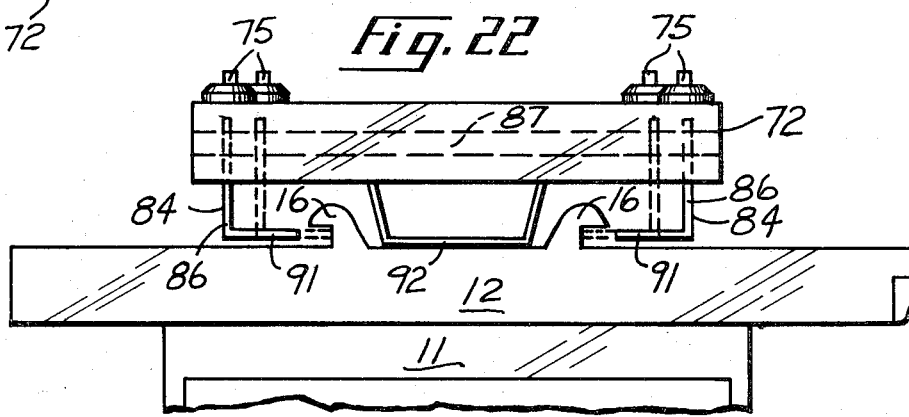
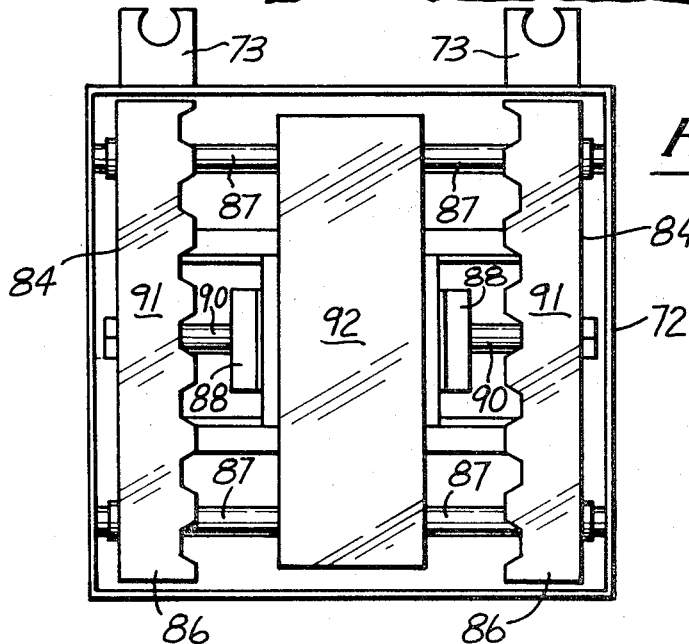

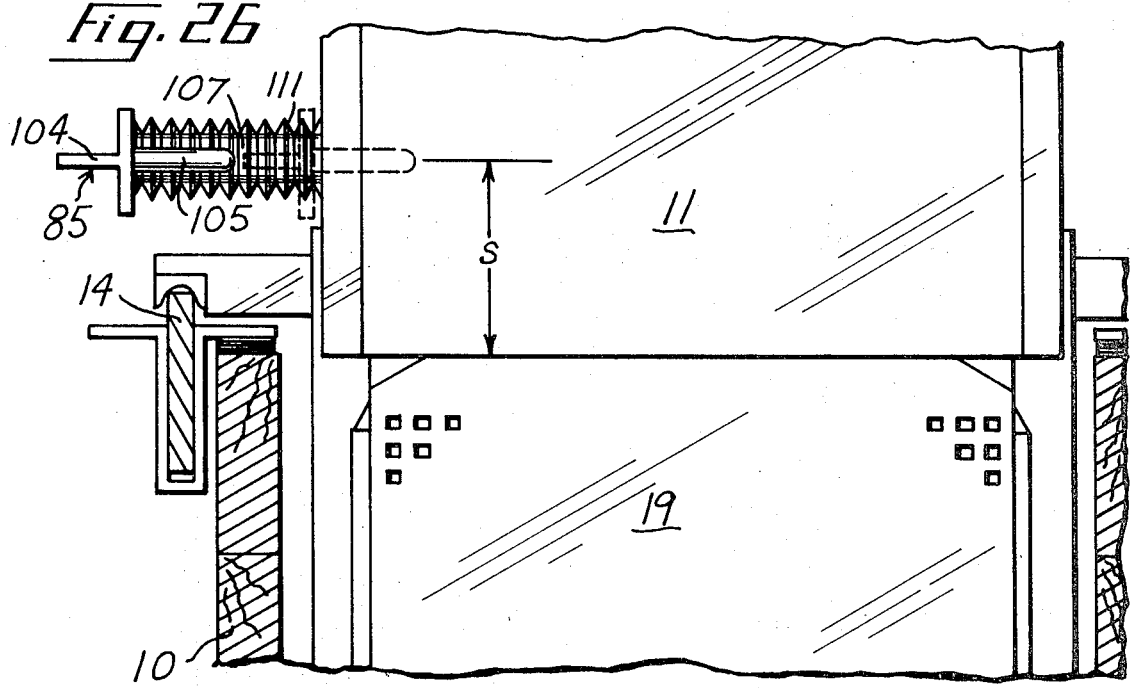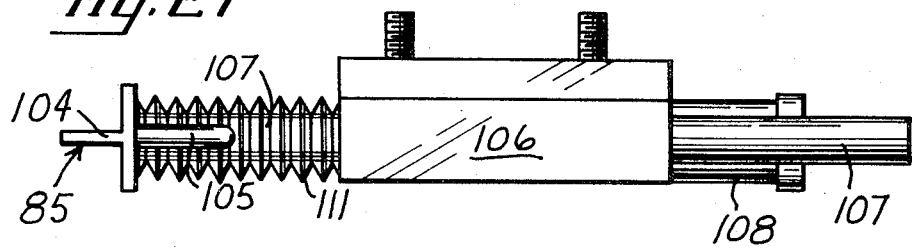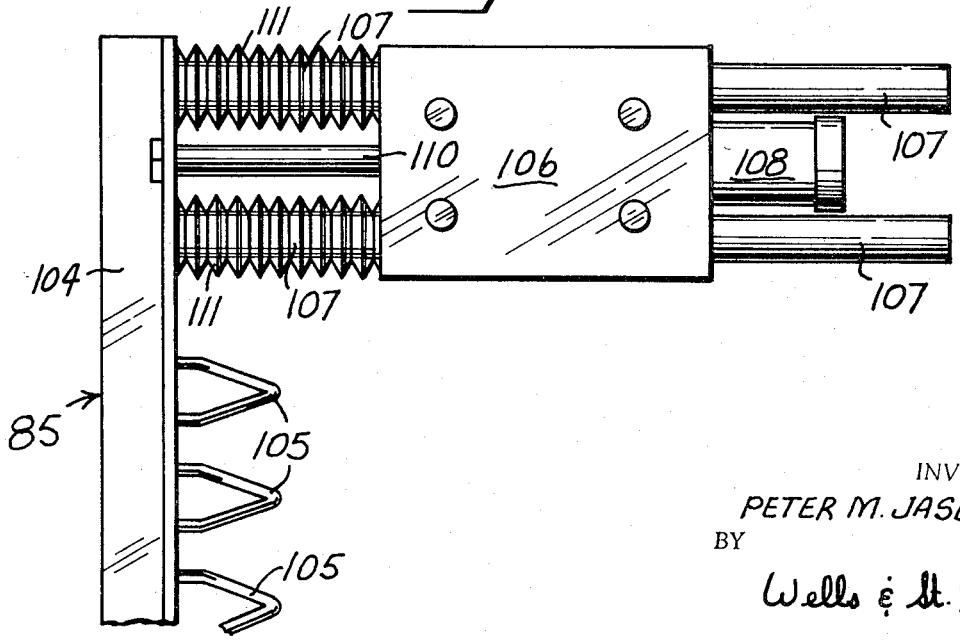

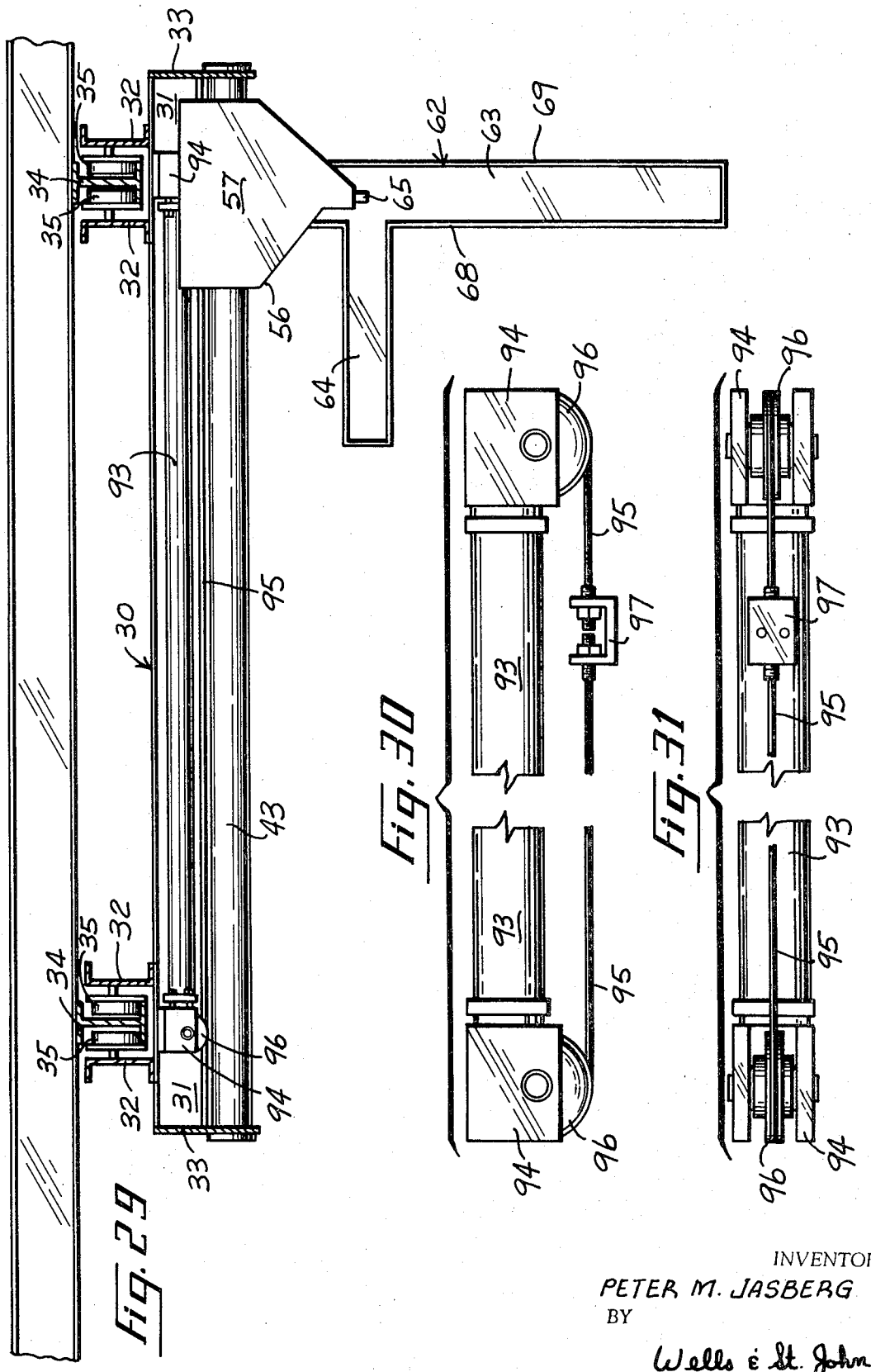

Feb. 9, 1971   P. M. JASBERG   3,562,131
CATHODE HANDLING EQUIPMENT
Filed March 21, 1968   15 Sheets-Sheet 15

INVENTOR.
PETER M. JASBERG
BY
Wells & St. John

3,562,131
CATHODE HANDLING EQUIPMENT
Peter M. Jasberg, Kellogg, Idaho, assignor to The Bunker Hill Company, Kellogg, Idaho, a corporation of Delaware
Filed Mar. 21, 1968, Ser. No. 715,018
Int. Cl. B65g 49/00
U.S. Cl. 204—198                                                      16 Claims

ABSTRACT OF THE DISCLOSURE

Cathode handling equipment for use in connection with electrowinning operations utilizing electrolytic cells wherein metal is periodically deposited and removed from plate-like cathodes. The present structure provides an automated mechanism for pulling and replacing groups of cathode units in the cell, transferring cathodes between a cell and an overhead conveyor. The cathode handling equipment is mounted on a bridge capable of travelling along the length of the row of cells, being properly indexed at each cell. The cathode handling units can be indexed to handle differing groups of cathode units within the respective cells.

BACKGROUND OF THE INVENTION

Metals such as zinc are recovered by an electrowinning process on plate-like cathode units spaced between anodes in an electrolyte bath within a cell. In such an operation, the cathodes must be removed from a cell to permit the metal to be stripped from the cathode surfaces, and the removed cathodes must be replaced by clean cathodes to permit the electrolytic deposition to continue in the cell on a constant basis. The removal of cathodes is conventionally accomplished by manual effort, generally requiring two men to lift the cathode and place them on a truck for transport purposes. The cathodes are normally removed individually and a clean cathode is generally substituted as each cathode is removed from the cell.

To automate the removal of cathodes, it is necessary to provide a device capable of handling the heavy loads involved and having adequate capacity to remove cathodes from cells which generally include twenty or more cathode units. In the example given herein, each cell includes twenty-one cathodes and they are handled in groups of seven cathodes each. Furthermore, it is essential that the cathodes be removed and replaced in fairly rapid succession, since the removal of a group of cathodes in one cell increases the average current through the remaining cathodes of the cell until they are replaced. It also is essential that the cathodes be handled so as not to damage their structure or surfaces, which are generally fabricated of soft conductive metal, such as aluminum in the case of a zinc recovery process.

The present apparatus also is compatible with a conveyor system for carrying the cathodes to any desired location.

SUMMARY OF THE INVENTION

The invention described herein basically comprises the combination with the cell, cathode supports and conveyor of cathode handling equipment for transferring a group of spaced cathode units between the cell and conveyor including, grasping means to engage the group of cathode units, lifting means for elevating or lowering the cathode units and carrier means for shifting the group of cathode units between the cell and conveyor. In addition, the embodiment shown includes features relating to the mobility of the framework on which the equipment is mounted and the manner in which this movable framework or bridge is interrelated to the operation of the conveyor. Another feature of the invention is the indexing of both the bridge and the carrier to permit a single apparatus to carry out identical functions with relation to a row of cells and with relation to a plurality of groups of cathodes in a single cell. Still another feature of the invention is the utilization of a pair of cathode handling units mounted side by side on a common movable supporting bridge so that the adjacent cells are handled simultaneously in the pulling and replacing of cathode units.

It is a first object of the invention to produce an apparatus which is capable of automatically handling the removal and replacing of cathode units in a production electrolytic recovery operation.

Another object of the invention is to provide a relatively simple mechanical apparatus capable of effectively handling the relatively heavy load requirements involved in the carrying and moving of a group of cathode units.

Another object of the invention is to provide a movable cathode handling device which can be accurately indexed for operation on any cell along a row of cells and which can accurately align itself with a particular group of cathode units in a cell.

Another object of the invention is to provide an apparatus which will pull and replace cathode units in adjacent cells on a production basis.

These and further objects will be evident from the following disclosure and the accompanying drawings, which together illustrate a preferred form of the invention. It is to be understood that this form of the invention is only presented by way of illustration and that modifications might be made in adapting the apparatus to a particular production application.

BRIEF DESCRIPTION OF THE DRAWINGS

FIG. 1 is a schematic plan view of a row of cells and the cathode handling equipment described herein;

FIG. 2 is a schematic side elevation taken from the lower side of FIG. 1;

FIG. 3 is a front elevation of the cathode transferring apparatus, as viewed substantially along line 3—3 in FIG. 1;

FIG. 4 is a side elevation of the transfer apparatus and conveyor as viewed along line 4—4 in FIG. 1;

FIG. 5 is a top plan view of the cathode handling equipment and conveyor as shown in FIG. 4;

FIG. 6 is an elevation view of the conveyor, as seen along line 6—6 in FIG. 1;

FIG. 7 is an enlarged side view illustrating the conveyor indexing apparatus and bridge support;

FIG. 8 is an enlarged fragmentary front view illustrating the conveyor indexing apparatus as seen from the left in FIG. 7;

FIG. 9 is an enlarged sectional view taken along line 9—9 in FIG. 7;

FIG. 10 is an enlarged sectional view taken along line 10—10 in FIG. 7;

FIG. 13 is an enlarged fragmentary sectional view of the bridge indexing apparatus as seen along line 13—13 in FIG. 4;

FIG. 14 is a fragmentary sectional view taken along line 14—14 in FIG. 13;

FIG. 15 is a sectional view through the supporting I-beam for the carriage as seen along line 15—15 in FIG. 13, the central section of the I-beam being broken away;

FIG. 16 is a plan view of a carriage and lifting frame substantially as seen along line 16—16 in FIG. 4;

FIG. 17 is a side elevation of the carriage and lifting frame as seen from the bottom of FIG. 16, a portion of the lifting frame being broken away;

FIG. 18 is a rear elevation view of the structure shown in FIG. 16;

FIG. 19 is a vertical sectional view taken along line 19—19 in FIG. 18;

FIG. 20 is a side elevation of a lifting frame and lifting head, with a portion of the lifting frame being broken away and with the uppermost position of the lifting head being shown in dashed lines;

FIG. 21 is a rear elevation view taken from the right in FIG. 20, with portions of the lifting frame being broken away and with the uppermost position of the lifting head being shown in dashed lines;

FIG. 22 is a front view of a lifting head, illustrating the manner in which a cathode unit is grasped thereby;

FIG. 23 is a top view of the lifting head shown in FIG. 22;

FIG. 24 is a side elevation view of the lifting head;

FIG. 25 is a bottom plan view of the lifting head;

FIG. 26 is a front sectional elevation view taken through a cell at an enlarged scale, illustrating the cathode plate alignment device;

FIG. 27 is a front elevation view of the cathode plate alignment device;

FIG. 28 is a plan view of the device shown in FIG. 27, with the outer portion of the device being broken away;

FIG. 29 is a vertical sectional view showing the apparatus for moving the carriage as seen along line 29—29 in FIG. 5;

FIG. 30 is an enlarged side view of the actuating cylinder assembly for a carriage, the central section of the assembly being broken away;

FIG. 31 is a bottom view of the structure shown in FIG. 30;

PREFERRED EMBODIMENT OF THE INVENTION

Figure 11:
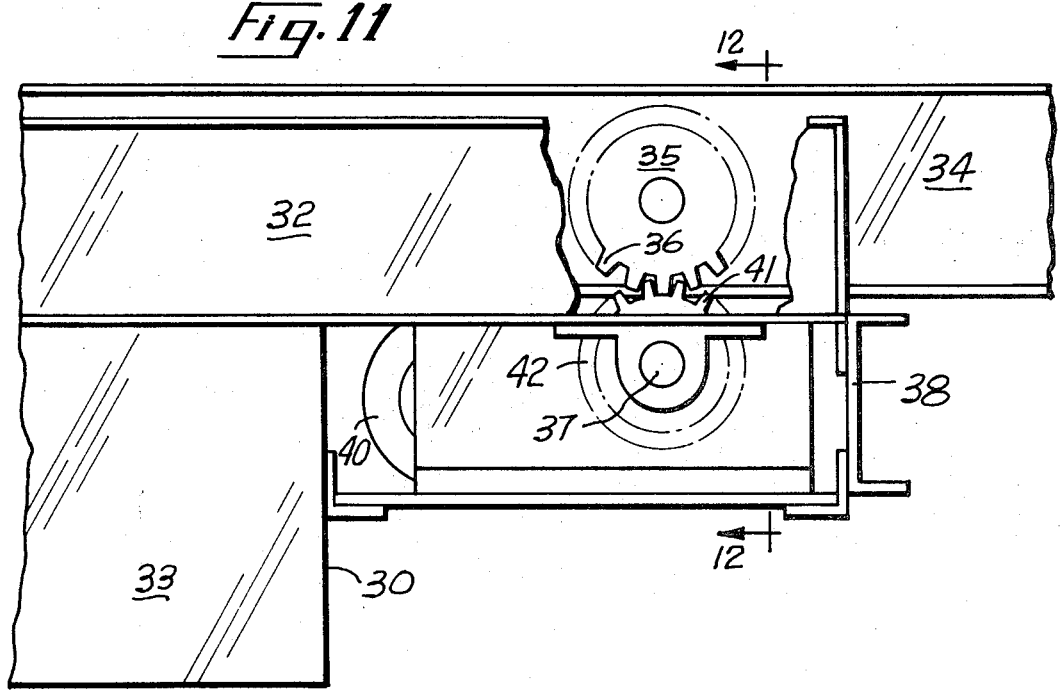
FIG. 11 is an enlarged front view of a portion of the bridge as seen along line 11—11 in FIG. 5, a portion of the solid frame members being broken away.

The apparatus described herein is designed for the handling of cathodes in an electrowinning operation such as is used in the electroylytic recovery of zinc. The equipment with which this disclosure is specifically concerned is utilized to automatically pull groups of cathodes from the cells in such an operation and transfer the metal-laden cathodes to a receiving conveyor and subsequently receive clean cathodes from the same conveyor and replace these in the cell for deposition of the metal.

The general arrangement of the apparatus is best seen in FIGS. 1-5. These drawings generally illustrate the nature of the electrolytic cell 10, within which are located a plurality of cathode units 11 interspersed between anode units 19. The anode units 19 in this instance also include guides mounted therein which locate the cathode units 11 within the cell in parallel spaced positions centered longitudinally along the length of the cell. The nature of the precise structure utilized in both the cathode units 11 and anode units 19 is not particularly material to an understanding of the present apparatus. Variations in the anode structure, cathode structure and guide structures can obviously be accommodated.

As used herein, the term "longitudinally" will refer to the longer dimension of an individual cell, this being the dimension perpendicular to the anode and cathode units. The term "transverse" will be used to indicate the direction across an individual cell parallel to the anode and cathode units. The area as the lower side of FIG. 1 is termed the "front" of the apparatus, and the upper side is termed the "rear." The various devices to be described will be thus related to the basic cell structure and the cathode units 11 utilized therein.

Within each cell 10 the cathode units 11 are vertically supported by means of transverse header bars 12 which rest on bus bars 14 and heel supports 15 that extend longitudinally along the respective sides of each cell 10. Each cathode unit 11 generally comprises a transverse header bar 12 and a flat depending plate 13 secured thereto. In the structure shown, each header bar 12 is provided with a pair of upwardly protruding ears 16 having inwardly directed notches formed therein through their outwardly facing edges. The longitudinally aligned rows of ears 16 of a group of cathode units are transversely spaced from one another and present a protruding configuration extending upwardly from the respective header bars 12 by which the cathode units 11 can be engaged as a group by the instant apparatus.

CONVEYOR APPARATUS

As indicated in FIGS. 1 and 2, the cathode units received from or delivered to the individual cells 10 are tarnsported along the row of cells by a powered overhead conveyor shown toward the bottom of FIG. 1 and in the foreground in FIG. 2. The details of the conveyor apparatus are shown in FIGS. 6–8 and the relative location of the conveyor and cathode handling equipment is best seen in the side elevation of FIG. 4.

The cathode handling equipment and the individual conveyor elements are designed to carry the cathode units 11 in multiple groups. In the illustrative structure shown in the drawings, the cathode units 11 are handled in groups of seven, there being twenty-one cathode units (three groups) in a completely filled cell.

The conveyor comprises a number of trolleys 17 which are movably supported by wheels 18 that ride along inwardly facing guide channels 20 supported by transverse framework members 28. The trolleys 17 are individually moved in a transverse direction along the row of cells 10 by means of a constantly moving chain 21 having protruding lugs 22 that engage the individual trolleys 17.

Each trolley 17 has a movable dog 23 that selectively intersects the path of movement of the lugs 22 in the driving flight of the chain 21. The position of each dog 23 is determined by a control lever 24 that protrudes forwardly from the trolley 17. When the lever 24 is in its normal gravitational position, the dog 23 is extended upwardly and will be contacted by a moving lug 22 to carry the trolley 27 along the conveyor. When the lever 24 is pivoted upwardly, dog 23 is retracted downwardly and the lugs 22 then pass freely across the trolley 17, leaving it in a stationary position. All succeeding trolleys coming into engagement with a stationary trolley will also be stopped due to contact of their respective levers 24 with a protruding rear stop 27 that also is provided at each trolley 17. The center to center distance between stopped trolleys 17 is such as to properly space these trolleys for interaction with the cathode handling equipment described herein as will be evident below. The precise details of the trolley structure are not necessary for an understanding of the cathode handling equipment and are conventional in the type of conveyor assembly illustrated.

Suspended below each trolley 17 is a cathode carrier 25 that includes a pair of transversely spaced support arms 26 which are inwardly open toward the row of cells 10 (FIG. 4). The upper surface of each support arm 26 is notched to receive the respective ends of the header bars 12 which rest upon them when cathode units 11 are carried on the carrier 25. The spacing of the notches formed on the support arms 26 is identical to the spacing of the cathode units 11 in the cell 10. The cathode units 11 on the support arms 26 are therefore in the identical spatial relationship required within the cell 10 and their orientation with respect to cell 10 is parallel to their desired positions within the cell 10.

TRAVELLING BRIDGE ASSEMBLY

Figure 12:
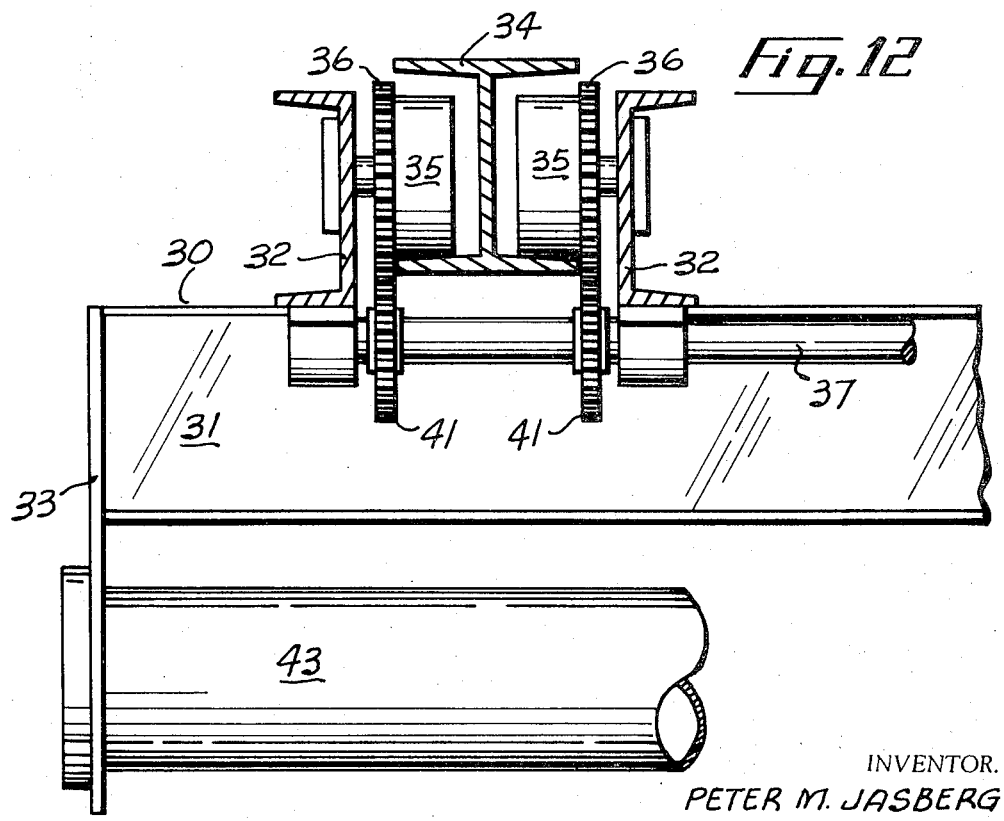
FIG. 12 is a fragmentary sectional view taken along line 12—12 in FIG. 11.

The cathode handling equipment used to deliver groups of cathode units 11 to or from the individual cell 10 in a row of cells is illustrated in FIGS. 1 and 2 as being mounted on a movable bridge generally denoted in the drawings by the numeral 30. The bridge is shown in general detail in FIGS. 3, 4 and 5. It comprises three longitudinal girders 31 and side channels 38. The bridge 30 is movably guided by a pair of fixed I-beams 34 which serve as guiding rails for wheels 35 rotatably mounted on the transverse channels 32 (FIGS. 4, 11, 12). The wheels 35 are each rotatably mounted about longitudinal axes on bridge 30. One set of four wheels is powered to move the bridge 30, there being two powered wheels 35 in engagement with each I-beam 34. Power is applied to these wheels 35 by means of gears 36 formed integrally with them and in mesh with gears 41 fixed to a longitudinal driving shaft 37 that is rotatably mounted on the bridge 30 (FIGS. 5, 11, 12). The shaft 37 is selectively powered by a motor 40 and gear reducer unit 42 on the bridge 30.

Mounted across the longitudinal ends of girders 31 are downwardly extending end plates 33. The plates 33 support longitudinal guide rods 43 which are circular in cross section and which are suitably lubricated to provide a bearing for a movable carriage assembly described below. The girders 31 also rotatably support longitudinal shafts 44 that control index stops for the carriage assembly as will be described below.

The bridge 30 is successively positioned above each individual cell 10 in the row of cells during each cycle of operation of the apparatus carried thereby. This positioning is achieved by means of an indexing unit best seen in FIGS. 5, 13, 14 and 15. The indexing arrangement, which is identical at each longitudinal end of the bridge 30, is composed of a slotted cylindrical pin 45 that slides along protruding horizontal guides 46. The respective guides 46 protrude inwardly from the channels 32 to locations immediately adjacent the upright web of each I-beam 34 (FIGS. 13, 14). The slotted pin 45 is slidably engaged by guides 46 when extended through accurately spaced apertures 47 along each I-beam 34.

Each pin 45 is movably positioned by means of a pneumatic cylinder assembly 48 mounted on the respective channels 32. The bridge 30 is moved incrementally between each identically spaced aperture 47 on each I-beam 34 by power from the motor 40 after retraction of the pins 45. During movement of the bridge, cylinder 48 is actuated to push the outer end of each pin 45 against the web of the adjacent I-beam 34. Therefore, when the pin 45 is brought into alignment with the next aperture 47 in the direction of travel of bridge 30, it will be forced through the aperture and will be locked between the channels 32 in a rigid position. Prior to engagement of pins 45, the power to motor 40 should be automatically discontinued to permit bridge 30 to "coast" to its next position. The two pins 45 at the opposite ends of bridge 30 insure accurate alignment of the bridge 30 relative to the I-beams 34 and thereby relative to the cell below them.

The carriers 25 of the conveyor assembly also must be accurately located relative to bridge 30 so as to permit the carriers to either deliver or receive groups of cathode units 11 from the cathode handling equipment on the bridge 30. This is accomplished by means of a longitudinally movable cam member 50 mounted at the outer end of a piston rod 51 located by a pneumatic cylinder 52 mounted on one of the girders 31 as seen in FIGS. 4, and 6-8. The cam 50, when engaged by a trolley 17 as shown in FIGS. 6 and 8 will stop the engaged trolley 17 by causing the control lever 24 thereof to be lifted. It also will properly locate the next succeeding trolley 17 due to engagement of that trolley with the rear of the trolley 17 engaged by the cam 50 (FIG. 6). The two carriers 25 suspended from the stationary trolleys 17 are thereby accurately positioned in the desired transverse relationship with respect to bridge 30 so that groups of cathode units 11 can be either removed from the support arms 26 or delivered to the support arms 26 of the respective carriers 25, in the manner described below.

When the cam 50 is retracted from the path of the trolley 17 as shown in full lines in FIG. 7, the first trolley previously held stationary is therefore free to again begin movement along the conveyor when it is next contacted by a moving conveyor lug 22. In operation of the device, only one trolley 17 is released by the cam 50 in a given cycle of operation. The cam 50 is automatically extended after passage of the first trolley and is then engaged by the control lever 24 of the succeeding trolley 17, which will be moved to the cam 50 also by a lug 22 on the moving chain 21.

The cam 50 is guided for reciprocable movement on the bridge 30 by the structure shown in FIGS. 7, 9, and 10. The piston rod 51, which is circular in cross section, is provided with a rectangular outer section 51a slidably received through a complementary sleeve bearing 53. The sliding engagement of this rectangular extension 51a prevents the cam 50 from pivoting about the axis of the piston rod 51.

CARRIER AND LIFTING ASSEMBLY

Movably suspended beneath the bridge 30 are two cathode handling units 54, 55 which are identical in structure.

Each unit 54, 55 includes a carriage 56 slidably guided by the respective pairs of guide rods 43 on bridge 30 for movement longitudinally with respect to the bridge 30 and with respect to the cells 10. The details of the carriage structure can best be seen in FIGS. 4 and 16-19. Each carriage basically comprises a rigid frame including side plates 57 and transversely directed plates 58 that support bearings that encircle the two rods 43 that support the carriage. The upper edges of the plates 57 and 58 are co-planar. As shown in FIGS. 16 and 19, each carriage 56 includes four pockets 60 within which are positioned inflatable pads 61 connected to a suitable source of pneumatic pressure.

Suspended from each carriage 56 is a lifting frame designated by the numeral 62. Each lifting frame includes a vertical section 63 and an upper horizontal section 64 that protrudes toward the conveyor assembly. The lifting frame 62 is slidably guided within its supporting carriage 56 by means of outwardly directed vertical slides 65 located between spaced upper and lower guides 66 on the inner surfaces of the side plates 57. Upper plates 67 at the top end of each lifting frame 62 overlap the upper edges of the carriage 56 and rest upon the four pads 61. The upper plates 67 are movable between an elevated position shown in FIGS. 17-19 when pressure is applied to the interior of pad 61 and a slightly lower vertical position resting upon carriage 56 when the pads 61 are exhausted.

Each lifting frame 62 is basically comprised of a skeleton frame having the main vertical surfaces covered by forward and rear plates 68, 69 respectively. The interior of the lifting frame 62 provides space for the lifting apparatus shown in FIGS. 20 and 21, where the exterior portions of the lifting frame 62 are broken away for illustrative purposes.

Each lifting frame 62 is further provided with a pair of vertical guide rods 70 suspended from their respective upper ends beneath the horizontal section 64 adjacent to the vertical sections 63 thereof. Each rod 70 is supported along its entire length by a backing web 71 fixed along the adjacent vertical section 63 of the lifting frame 62.

Slidably supported on each lifting frame 62 is a lifting head 72 mounted for substantial vertical movement relative to both the lifting frame 62 and supporting carriage 56. The lifting head 72 is basically a rectangular rigid frame, seen in FIGS. 22-25. It is slidably guided at its rear longitudinal end by protruding ears 73 which are apertured to fit about the guide rods 70. The lifting head 72 is vertically positioned by four chains 74 having their forward ends anchored to the lifting head 72 at connectors 75 (FIG. 20). The intermediate portions of the chains 74 are engaged over idler sprockets 76 rotatably journalled by shafts 77 on the lifting frame 62. Each chain 74 has its outer end adjustably anchored at the outside of the vertical section 63 of the lifting frame by an adjustable bolt assembly 78. The section of each chain 74 within the vertical section 63 of the lifting frame between the bolt assemblies 78 and the idler sprockets 76 is engaged by rotatable sprockets 80 mounted on a movable transverse shaft 81 vertically positioned at the end of a piston rod 82 in an upright cylinder assembly 83. By extension or retraction of the piston rod 82, vertical movement can be imparted to the lifting head 72 through the chains 74 in a manner illustrated by the solid and dashed line positions shown in FIG. 21.

CATHODE GRASPING MECHANISM

The grouped cathode units 11 are engaged and supported during transfer by the header bar grasping apparatus 84 shown in detail in FIGS. 22-25 and by an auxiliary cathode plate alignment device 85 shown in FIGS. 26-28. The header bar grasping apparatus 84 carried by weight of the cathode units 11 engaged thereby during transferring operations. The cathode plate alignment device 85 is used during movement of a group of cathode units 11 to prevent the plates from moving relative to one another and possibly damaging the plate or deposited metal surfaces.

The header bar grasping apparatus (FIGS. 22-25) is basically comprised of a pair of opposing horizontal jaws 86 slidably supported by transverse guide rods 87 mounted on the respective lifting heads 72. The jaws 86 on each lifting head 72 are moved inwardly or outwardly in unison by a cylinder assembly 88 having oppositely extending piston rods 90 connected respectively to the individual jaws 86.

As can be seen particularly in FIG. 25, each jaw 86 includes a horizontal longitudinal plate 91 having an inwardly facing edge that is notched to spatially engage the complementary notches formed in the header bar ears 16. The plates 91, when moved inwardly, intersect the ears 16 so that a lifting and supporting force can be provided to the cathode units 11 through the jaws and lifting head. A centrally positioned longitudinal abutment 92 is provided between the jaws 86 and has a lower downwardly facing surface at an elevation slightly below the elevation of the jaw plates 91. The abutment 92 is adapted to engage the upper central portion of each cathode unit 11 to properly position the jaws 86 for engagement with the header bar ears 16.

The cathode plate alignment device 85 is shown in detail in FIGS. 26-28. It comprises a longitudinal horizontal member 104 having a plurality of tapered rod fingers 105 extending inwardly therefrom, between which the cathode plates 11 can fit. The member 104 is movably supported at the lower end of the lifting frame 62 (FIG. 4) by means of a mounting bracket 106 that slidably supports a pair of guide rods 107 extending inwardly from the horizontal member 104 in a transverse direction. A transverse operating cylinder 108 is mounted on the bracket 106 between the guide rods 107 and includes a movable piston rod 110, the outer end of which is fixed to the member 104. The sections of the guide rods 107 between bracket 106 and the member 104 are preferably covered by a protective bellows 111 for corrosion protection. The member 104 is movable from an outwardly extended position at which the fingers 105 are clear of the cathode units 11 suspended from the related lifting head 72 to an inwardly retracted position at which a single cathode plate 13 will be received between adjacent fingers 105 to prevent the plates 13 from swinging about the pivot provided by their header bars. These positions are illustrated in dashed lines and full lines in FIG. 26.

LONGITUDINAL INDEXING APPARATUS

The apparatus for moving the respective carriages 56 in a longitudinal horizontal direction is best shown in FIGS. 29-31. It comprises a conventional power assembly utilizing a conventional cable cylinder 93 operated by pneumatic pressure to reciprocate a cable 95 wrapped about end pulleys 96 rotatably mounted in pulley supports 94 fixed to the bridge 30. The cable 95 is provided with a bracket 97 secured by bolts to the carriage 56 so that carriage 56 will move in unison with the cable 95. The cylinder assembly 93 is centered with respect to the carriage 56 within an upper channelled area and is oriented in a longitudinal position relative to both the bridge 30 and the respective cells 10.

The limit of movement of each carriage 56 adjacent to the conveyor assembly is defined by abutment of the carriage 56 against the adjacent end plate 33 of the bridge 30, as shown at the left in FIG. 4. However, the carriages 56 are adjustably positioned at their opposite end of travel, depending upon which of the multiple groups of cathode units 11 is to be handled in a given operating sequence.

Figure 32:
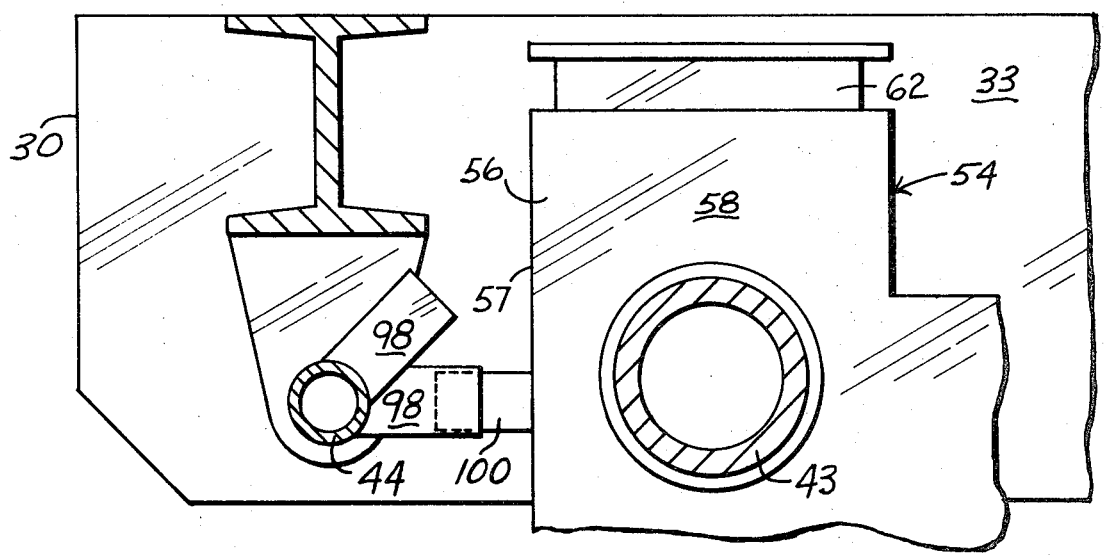
FIG. 32 is an enlarged fragmentary sectional view taken along line 32—32 in FIG. 4 illustrating the indexing stop apparatus for a carriage.
Figure 33:
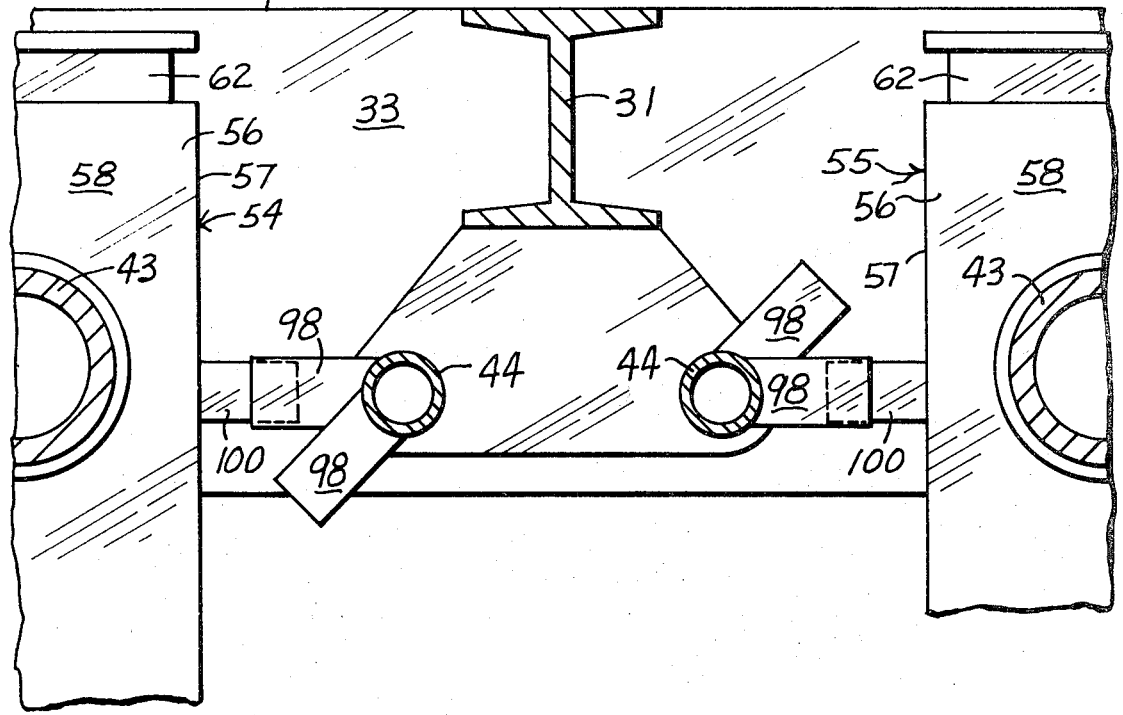
FIG. 33 is a view similar to FIG. 32, but taken along line 33—33 in FIG. 5.

As shown in FIGS. 4 and 5, and as more specifically illustrated in FIGS. 32, 33, an adjustable indexing apparatus is utilized to provide a variable stop at this end of the bridge 30. The previously described longitudinal shafts 44 are rotatably journalled on the bridge 30 about parallel longitudinal axes. Each shaft 44 is provided with two radially protruding stops 98 fixed to it, one being located at the front end of the shaft 44 and the other being located at its center. The spacing between the stops 98 is identical to the longitudinal span across a group of cathode units 11. The rear end plate 33 of bridge 30 serves as a third stop for positioning the carriage over the outermost group of cathode units as shown at the right in FIG. 4.

The two stops 98 on each shaft 44 are angularly offset from one another. A protruding bumper 100 is fixed to the carriage side plate 57 adjacent to each shaft 44 and extends outward so as to be engageable with a selected stop 98 when the stop 98 is in a horizontal position. If the bumper 100 does not contact either stop 98, it will contact the rear end plate 33 and hold the carriage 56 in the position shown at the right in FIG. 4.

The shafts 44 are rotated in unison by an oscillator 101 mounted on bridge 30. The output shaft of oscillator 101 is connected by means of chain 102 and suitable sprockets to the inner shafts 44. The other shafts 104 are rotated oppositely to the inner shafts 44 by means of connecting chains 103 and suitable sprockets at the ends of the shafts 44. The oscillator 101 is preset so that it will pivot each shaft 44 an angular amount equal to the angular separation between the two stops 98 each time that it is actuated. One can therefore select which stop 98 is to be contacted by the bumpers 100 at each side of the respective carriages 56 and if the last group of cathode units 11 is to be handled (as illustrated), both stops 98 are pivoted clear of bumper 100. The yieldable nature of the cylinder assembly 93 holds each carriage 56 against the respective stops 98 or end plate 33 when the carriage is in its rearward position over the row of cells 10.

OPERATION

The apparatus described above is capable of operating in several different sequential patterns. All of these patterns involve two basic sequences, the cathode pulling sequence and the cathode replacing sequence. As will be described below, both units 54, 55 can be set so as to carry out the cathode pulling sequence simultaneously and subsequently carry out the cathode replacing sequence. Alternately, the units 54, 55 can be programmed so that one unit 55 is pulling a group of cathodes while the other unit 54 is replacing a group in the adjacent cell. The devices as illustrated in the drawing are shown in positions that illustrate both alternate sequences, the unit 55 being drawn in positions relating to the cathode pulling sequence and the unit 54 being drawn in positions relating to the cathode replacing sequence. The general operating sequences will be more explicitly set out after the detailed steps of each has been outlined.

CATHODE PULLING SEQUENCE

To understand the operational steps involved in pulling a group of cathode units 11 from a cell 10, reference will be made to the drawings relating to the cathode handling unit 55. At the start of the pulling cycle, the prepositioned bridge 30 is located so as to position the unit 55 above the cell 10 from which cathode groups are to be removed. An unloaded carrier 25 is aligned in front of the cathode handling unit 55 due to engagement of its trolley control lever 24 by the cam 50. The succeeding carrier trolley 17 is also aligned in front of the adjacent cathode handling unit 54, this required spacing being defined by engagement of its control lever 24 with the rear stop 27 of the trolley 17 forward of it.

The carrier 56 is initially in its rearward position, the particular rearward position being defined by the angular position of shafts 44 as described above with respect to the proper indexing of carriages 56. The carriages 56 are maintained in their rearward position during indexing movement of bridge 30 from one location along the row of cells 10 to the next as previously described. After positioning of the carriers 25 relative to bridge 30 and positioning of bridge 30 with respect to the cell 10, the operation of the apparatus under either automatic or manual controls will proceed as follows.

At the initiation of a sequence, the lifting frame 62 of the carriage will be in its normal elevated position as shown in FIGS. 17, 18 and 19. The empty lifting head 72 of the cathode handling unit 55 begins moving vertically downward over the group of cathode units 11 which are to be pulled from the cell 10. This downward movement of the lifting head 72 is controlled by cylinder assembly 83 (FIG. 21). The lifting head 72 will continue its downward movement until the abutment 92 rests upon the group of cathode units 11 in the cell 10 beneath it. The gravitational force utilized to lower the lifting head 72 prevents undue forcing of the cathode units 11, any excess movement provided by cylinder assembly 83 being accommodated by the fact that the chains 74 will be slack. Jaws 86 then close to engage the respective ears of the cathode units 11 in the group to be pulled.

The operation of cylinder assembly 83 is then reversed, causing the lifting head 72 to move upward rather slowly to accommodate the weight of the metal-laden cathode units 11. The chains 74 therefore pull the lifting head 72 upwardly along the frame 62. When the head 72 reaches its uppermost position on the frame 62 it is held stationary a moment or two to permit draining or washing of the cathode units 11. Carriage 56 then moves forwardly to the front end of bridge 30.

The plate alignment devices 85 are used to prevent swinging of cathode units 11 during movement of carriage 56. During the pulling sequence, the cathode plate alignment device 85 is brought into position against the cathode plate 13 just prior to complete removal of the cathode units 11 from cell 10. This position is illustrated in FIG. 26, the height at which the rod fingers 105 engage plates 13 being shown by the distance S between the fingers 105 and the bottom of plate 13.

When the lifting frame 62 of cathode handling unit 55 is at its forward position abutting the front end plate 33 on the bridge, the inflatable pads 61 are exhausted to permit the lifting frame 62 to move slightly downward relative to carriage 56, bringing the cathode units 11 downward on empty conveyor carrier support arms 26. When the cathode units 11 are located on the conveyor, the plate alignment device 85 is extended to remove it from contact with the cathodes.

The cathode units 11 are released by opening jaws 86, the gravitational downward movement of the lifting frame 62 again being utilized to protect the cathode units and conveyor elements from unnecessary downward force during placement of the cathode units 11 on the conveyor. After release of jaws 86, the lifting frame 62 is subsequently elevated.

CATHODE REPLACING SEQUENCE

The steps used to replace a group of cathodes in a cell are best understood with respect to the positions illustrated in the drawings with respect to the cathode handling unit 54. The cathode replacing sequence begins with the carriage 56 at its forward position abutting the front end plate 33 on bridge 30 and with a conveyor carrier 25 aligned with the unit 54 and having suspended thereon a group of empty cathode units 11. The first step involves the exhausting of inflatable pads 61, permitting the lifting frame 62 to move slightly downward relative to its supporting carriage 56 until the abutment 92 rests on the upper central section of the header bars 12 of the cathode units 11 on the conveyor carrier 25. This contact serves to actuate cylinder assembly 88, which operates to close jaws 86 against the ears 16 on the group of cathode units 11 which are to be replaced in the cell.

The cathode units 11 are lifted from the conveyor carrier support arms 26 by the cathode handling unit 54 by application of pneumatic pressure to pads 61, lifting frame 62 relative to carriage 56. The cathode plate alignment device 85 is moved laterally into engagement against the side edges of the group of cathode plates 13 at the time the lifting frame 62 is elevated and prior to rearward movement of carriage 56.

After lifting frame 62 of the cathode handling unit 54 has been elevated a slight distance to clear the carrier support arm 26, the carriage 56 is returned to its rear position by reversal of the connection to the cylinder 93 which moves the carriage horizontally. This rearward movement continues until interrupted by engagement when the preselected stops 98 or end plates 33, depending upon which group of cathode units is being handled during a particular cycle.

The lifting head 72 of the cathode handling unit 54 moves vertically downward after reaching its rear position to insert the clean cathode units 11 in the previously emptied portion of cell 10 beneath it. The engaged plate alignment device 85 is released following initial insertion of the cathode units 11 into the cell structure. During all this time, the lifting frame 62 will be maintained in its normal elevated position.

When the cathode units 11 have been lowered to the extent that the header bars 12 are supported by the cell structure, the chains 74 will slacken. Jaws 86 can then be released and the lifting head 72 can be elevated to its original position adjacent to the upper horizontal section 64 of lifting frame 62.

GENERAL OPERATING SEQUENCES

Figure 34:
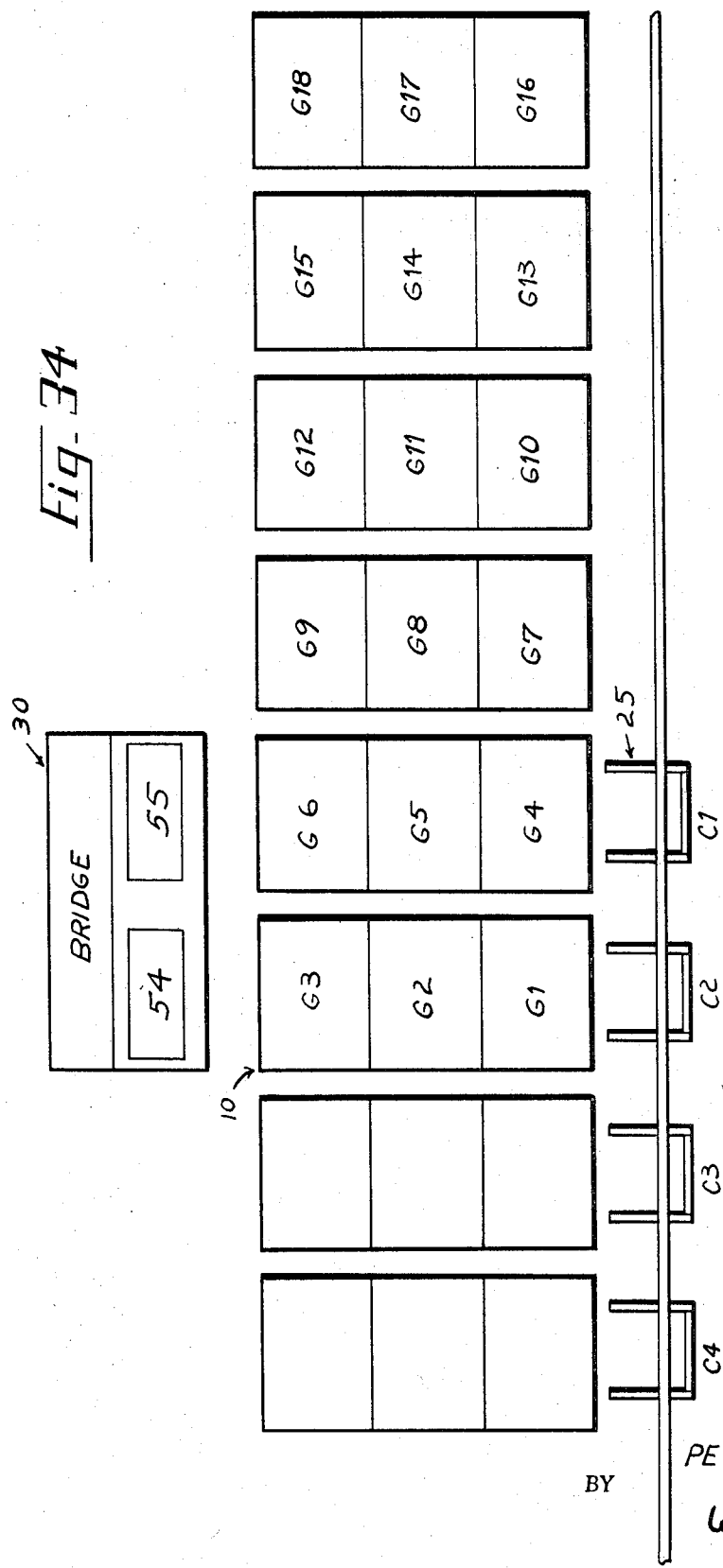
FIG. 34 is a schematic plan view for illustrating alternate operational sequences of the equipment.

Referring now to FIG. 34, there are several alternative general operating sequences that can be utilized with the above equipment, depending upon the particular requirements of an electrowinning operation. All of these variations utilize the basic cathode pulling sequence and cathode replacing sequence described above. The only modification involve changes in the programming of automatic controls or in the sequencing of manual controls, either of which is believed to be within the skill of the person familiar with the handling of such devices.

To illustrate these sequences, the bridge 30 is shown schematically in FIG. 34 as a support for the cathode handling units 54, 55. The cells 10 are illustrated as containing groups of cathodes numbered sequentially beginning with group G1. The conveyor carriers 25 are identified sequentially beginning with carrier C1.

In a first mode of operation, the units 54 and 55 operate identically at ay given time, each first pulling a group of cathods from the cells 10 and depositing the two groups simultaneously on a pair of carriers 25 and subsequently receiving two groups of empty cathode units and replacing these groups in the cells 10. As an example, the bridge 30 will be moved along the row of cells a distance equal to the width of two cell structures and will index units 54 and 55 in alignment with the respective cell 10. The indexing cam 50 will permit two carriers 25 to pass at a time, so that two empty carriers C1 and C2 will also be in alignment with the respective cells. Beginning at their rearward position on bridge 30, the units 54 and 55 will each operate through the above-described cathode pulling sequence and deposit the first two groups of cells G1 and G4 on the awaiting carriers C2 and C1 respectively. While at their forward position, the lifting frames 62 of both carriages will be elevated after deposit of the cathode groups. Cam 50 will then permit the carriers C1 and C2 to pass beyond bridge 30, stopping carriers C3 and C4 in alignment with the cells. The lifting frames 62 will then be lowered and the units 54, 55 will proceed through the cathode replacing sequence to return empty cathode groups to the waiting positions at G1 and G4 in the cells 10. After replacement of the cathode groups G1 and G4, oscillators 101 will be operated to rotate shafts 44 so as to index the carriages 56 above the next groups of cathodes G2 and G5. Carriages 56 will be moved rearwardly and lower the lifting heads 72 to begin another cathode pulling sequence. The groups of cathode units G2 and G5 will be placed on the waiting carriers C4 and C3 respectively, which will then proceed along the conveyor. This method of operation will be repeated until the cathode units G1 through G6 have all been pulled and replaced in the two cells. Bridge 30 then moves an additional two cells along the row of cells and the entire sequence is then repeated. This mode of operation has the advantage of permitting maximum operation of the pulling and replacing sequences with minimum indexing of bridge 30 being required, eliminating considerable time lost in indexing bridge 30 at each position longitudinally along the row of cells.

One modification of this operational sequence involves the identical operation of units 54 and 55 to handle two groups of cathodes simultaneously, but to eliminate the indexing of shafts 44 after each sequence, so that a corresponding group of cathodes is pulled and replaced in each cell during each indexed position of bridge 30. As an example, units 54 and 55 would pull and replace the cathode units in groups G1 and G4, and then bridge 30 would be moved so that they would pull and replace the cathode units in groups G7 and G10 and so on down the row of cells. Bridge 30 would ultimately be returned to its starting point and replace the next desired row of cell groups.

Another alternative is to operate the units 54 and 55 complementary to one another, using the cathode handling unit 55 to pull a group of cathodes while cathode handling unit 54 simultaneously replaces a group at the adjacent cell. As an example, unit 55 might be used to pull a group of cathodes from a cell while unit 54 replaces a group of cathodes in the adjacent cell structure. In such an operation, bridge 30 will be indexed one cell at a time along the row of cells 10. The unit 54 will be provided with a group of empty cathodes at its rearward position and unit 55 will be empty. While unit 54 is being lowered to replace a group of cathodes in the cathode replacing sequence, unit 55 will be lowered to grasp a group of metal-laden cathodes. While unit 54 is being moved forwardly to receive the next group of cathodes from carrier C2, unit 55 will be placing a group of cathodes on carrier C1. In this operation, the carriers 25 will exit from bridge 30 one at a time, so that carrier C2 after being emptied will be in position to receive a group of cathodes from unit 55. In this type of operation, the units 54 and 55 must operate along the row of cells, handling all of the cathodes in one group of cells and then returning to the starting point along the row to handle the next group of cathode units in the cells.

The choice of general operating sequences will be dependent upon the particular operating requirement of an installation. Obviously, the bridge 30 might carry only one cathode handling unit or might carry a greater number than two. Also, the cells might include a lesser or greater number of cathode units. Many modifications might be made in the application of the rather flexible apparatus described above, and for these reasons, the apparatus described herein is not intended to be limited to any particular operating requirements of an installation. All of the functions of the equipment can be carried out automatically by conventional hydraulic, electrical or pneumatic controls, or by manual operating controls on the structures themselves. The positions of the various elements can be detected by switches or valves on the equipment to program the various mechanisms for automatic sequencing as described. It is believed that the manner of designing and utilizing such controls is well known and that a further detailed description of specific control devices is not required for an understanding of this disclosure.

Having thus described my invention, I claim:

1. In an electrowinning apparatus:
    an upwardly open cell; and
    cathode supports along the sides of the cell upon which rest cathode units suspended within the cell;
    the improvement comprising:
        a conveyor including a cathode transfer station adjacent to the cell and elevated relative to the cell;
        and cathode handling equipment for transferring a group of spaced parallel cathode units between the cell and conveyor, wherein the cathode handling equipment comprises:
            a supporting framework;
            cathode grasping means for selectively engaging and elevationally supporting a group of spaced parallel cathode units in the spatial relationship required of them within the cell;
            lifting means on said framework operatively supporting the cathode grasping means for selective vertical elevational movement relative to the cell to thereby raise or lower a group of cathode units relative to the cathode supports and conveyor;
            carrier means on said framework for horizontally shifting a group of cathode units engaged by the cathode grasping means and elevated by said lifting means between a position at the cathode transfer station of the conveyor and a position vertically aligned above the desired location of the group of cathodes within the cell;
            and means on said framework operatively connected to said lifting means and to said carrier means for selectively causing movement of a group of cathode units between positions located at the conveyor transfer station and within the cell.

2. The apparatus as set out in claim 1 wherein each cathode unit comprises an upper header bar having transversely spaced ears projecting upwardly therefrom, each ear having an inwardly directed notch formed therein from the opposed outside edges thereof;

said cathode grasping means comprising:
- transversely movable jaws mounted on said lifting means, including inwardly directed edges complementary to the notches of said ears;
- second power means on said lifting means operatively connected to said jaws to move said jaws between a first position wherein the respective edges of the jaws are spaced outwardly beyond the width across the ears and a second position wherein said edges are spaced within the width across the ears so as to be engageable within the notches formed therein;
- a downwardly directed member mounted to said lifting means and fixed elevationally relative to said jaws and terminating in a lower surface elevationally spaced below the jaws, the width of said member being less than the separation between the ears on a header bar;
- said member being transversely located relative to the cell so as to be engageable with the header bars of cathode units engaged by said jaws so as to provide an elevational reference for operation of the jaws.

3. The apparatus as set out in claim 1 wherein each cathode unit includes a flat plate suspended from an upper header bar, said cathode grasping means comprising:
- header bar engaging means for engaging the header bar of each cathode unit to be supported thereby;
- and cathode plate engaging means below said header bar engaging means for engaging the plate side edges adjacent the lower ends thereof to thereby prevent movement of the cathode plates so engaged relative to one another.

4. In an electrowinning apparatus:
an upwardly open cell; and
cathode supports along the sides of the cell upon which rest cathode units suspended within the cell;
the improvement comprising:
- a conveyor including a cathode transfer station adjacent to the cell and elevated relative to the cell;
- and cathode handling equipment for transferring a group of spaced parallel cathode units between the cell and conveyor, wherein the cathode handling equipment comprises:
  - a supporting framework;
  - cathode grasping means for selectively engaging and elevationally suspending a group of spaced parallel cathode units in the spacial relationship required of them within the cell;
  - a carrier movably mounted on said framework for motion horizontally relative to the cell;
  - lifting means movably mounted on said carrier for vertical movement relative to the carrier, said cathode grasping means being carried by said lifting means for vertical movement therewith;
  - first power means on said framework operatively connected to said carrier to effect horizontal movement of the carrier, lifting means and cathode means relative to the framework required by transfer of a group of cathode units between the conveyor transfer station and the cell; and
  - second power means on said carrier operatively connected to said lifting means to effect vertical movement of the lifting means and cathode grasping means relative to the carrier as required by transfer of a group of cathode units between the conveyor transfer station and the cell.

5. An apparatus as set out in claim 4 wherein said lifting means comprises:
- a lifting frame movably mounted on said carrier for limited vertical movement relative to said carrier as required for placement or removal of a group of cathode units relative to the conveyor;
- third power means operatively connected between said carrier and lifting frame for selectively effecting said limited vertical movement;
- a lifting head movably mounted on said lifting frame for vertical movement of a magnitude sufficient to shift cathode units held by said cathode grasping means between a position wherein the cathode units are elevationally positioned at rest on the cathode supports as required within the cell and a position wherein the cathode units are above and elevationally clear of the cell;
- and fourth power means operatively connected between said lifting frame and lifting head for selectively effecting said vertical movement.

6. An apparatus as set out in claim 4 wherein each cathode unit includes a flat plate suspended from an upper header bar, said cathode grasping means comprising:
- header bar engaging means movably mounted on said lifting head for engaging the header bar of each cathode unit to be supported thereby;
- and cathode plate engaging means movably mounted on said lifting frame at an elevation below the header bar engaging means for engaging the cathode plates along one side thereof adjacent their lower ends to thereby prevent movement of the cathode plates so engaged relative to one another.

7. An apparatus as set out in claim 4 wherein each cathode unit includes a flat plate suspended from an upper header bar having a protruding configuration extending upwardly therefrom;
said cathode grasping means comprising:
- a pair of transversely movable jaws mounted on said lifting head for selectively engaging the protruding configurations of a plurality of cathode units;
- and cathode plate engaging means mounted on said lifting frame for selective engagement along the sides of cathode units engaged by said jaws to thereby prevent movement of the cathode units relative to one another while so engaged, said cathode plate engaging means being elevationally located on said lifting frame beneath the elevation of said jaws.

8. An apparatus as set out in claim 7 wherein said cathode plate engaging means is transversely movable relative to said lifting frame between a first position clear of the plates and a second position in engagement therewith;
and third power means on said lifting frame operatively connected to said cathode plate engaging means for selectively moving said cathode plate engaging means between said first and second positions.

9. In an electrowinning apparatus:
a row of upwardly open cells transversely adjacent to one another;
cathode supports along the sides of the respective cells upon which rest cathode units suspended within the cell, each cathode unit including a protruding header bar and depending flat plate;
the improvement comprising:
- an elevated conveyor extending along the length of the row of cells including individually movable conveyor members for suspending groups of cathode units;
- and cathode handling equipment for transferring cathode units horizontally and vertically between the cells and conveyor, wherein the cathode handling equipment comprises:
  - a supporting framework including guide rails along the row of cells;
  - a movable bridge extending over and across the cells, said bridge being movably supported on said guide rails for motion along the row of cells;

selectively operable indexing means on said bridge and guide rails to locate the bridge consecutively at corresponding stationary locations relative to successive cells along the row of cells;

conveyor control means on said bridge operatively engageable with selected conveyor members on the conveyor to locate the conveyor members so engaged at a cathode transfer station on the bridge;

cathode grasping means for engaging and elevationally suspending cathode units in the spatial relationship required within a cell;

lifting means operatively mounted on said bridge and supporting said cathode grasping means for imparting vertical motion to said cathode grasping means; and carrier means mounted on the bridge and operatively supporting said cathode grasping means for imparting horizontal motion to said cathode grasping means relative to said bridge.

10. An apparatus as set out in claim 9 wherein the conveyor members each comprise a pair of outwardly open horizontal support elements extending toward the row of cells upon which the bars of a group of cathode units can be freely suspended:

said cathode grasping means comprising selectively movable jaw means for engaging the header bars of cathode units so grouped and maintaining the relative positions of the cathode units in a group during subsequent movement of the cathode grasping means; and plate engaging means located elevationally below said jaw means for selective engagement with the side edges of the cathode plates while suspended from said jaw means.

11. An apparatus as set out in claim 9 wherein said cathode grasping means comprises:

first and second pairs of movable jaws each being independent of the other for individually grasping a group of cathode units, said jaws being so spaced in side by side relation on said bridge by said lifting means that the respective groups of cathode units grasped thereby are respectively centered relative to adjacent cells in said row of cells when said bridge is stationarily located by said indexing means;

first and second lifting heads movably mounted for vertical motion relative to said bridge and supporting said first and second pairs of movable jaws respectively, said first and second lifting heads being independent of one another.

12. An apparatus as set out in claim 11 wherein said lifting means comprises:

first and second lifting heads movably mounted for vertical motion relative to said bridge and supporting said first and second pairs of movable jaws respectively, said first and second lifting heads being independent of one another.

13. An apparatus as set out in claim 11 further comprising:

independent power means mounted on said bridge and operatively connected between said bridge and said first and second lifting heads respectively for vertically positioning said lifting heads relative to said bridge.

14. An apparatus as set out in claim 11 wherein said lifting means further comprises:

first and second lifting frames movably mounted for independent vertical motion relative to said bridge, said first and second lifting heads being movably guided and supported by said first and second lifting frames respectively;

first independent power means connected between each lifting frame and the lifting head guided and supported thereby to vertically position the lifting heads relative to the lifting frame; and second independent power means operatively connected between the bridge and each lifting frame to vertically position the lifting frames relative to the bridge.

15. An apparatus as set out in claim 14 wherein said cathode grasping means further comprises:

first and second plate engaging members mounted respectively on said first and second lifting frame elevationally below the respective jaws for selective engagement with the side edges of the cathode plates while suspended from said jaws to thereby prevent relative movement of the cathode plates so engaged.

16. An apparatus as set out in claim 14 wherein said carrier means comprises:

first and second carrier frames movably mounted on said bridge for horizontal motion independently of one another perpendicular to the direction of movement of the bridge along the guide rails;

said first and second lifting frames being movably guided and supported on said first and second carrier frames respectively;

said second independent power means being connected between the respective carrier frames and lifting frames; and third independent power means connected between the bridge and each carrier frame to horizontally position the carrier frames relative to the bridge.

References Cited
UNITED STATES PATENTS

| | | | |
|---|---|---|---|
| 2,591,682 | 4/1952 | Davis | 204—198X |
| 2,789,569 | 4/1957 | Davis | 204—198X |
| 2,851,044 | 9/1958 | Davis | 204—198X |
| 2,929,487 | 3/1960 | Lisowski et al. | 198—20 |
| 2,958,330 | 11/1960 | Huenerfauth | 204—198X |
| 2,958,331 | 11/1960 | Borodin | 204—198X |
| 3,076,673 | 2/1963 | Kaplan et al. | 294—86X |
| 3,199,910 | 8/1965 | Bradley | 294—86X |
| 3,252,603 | 5/1966 | Davis | 214—86 |
| 3,381,695 | 5/1968 | Clark | 204—198X |

TA-HSUNG TUNG, Primary Examiner

R. J. FAY, Assistant Examiner

U.S. Cl. X.R.

198—77; 214—86